United States Patent [19]

Kühbauch

[11] Patent Number: 4,639,966
[45] Date of Patent: Feb. 3, 1987

[54] WINDSHIELD WIPER DEVICE

[75] Inventor: Gerd Kühbauch, Bühlertal, Fed. Rep. of Germany

[73] Assignee: Robert Bosch GmbH, Stuttgart, Fed. Rep. of Germany

[21] Appl. No.: 702,878

[22] Filed: Feb. 19, 1985

[30] Foreign Application Priority Data

Mar. 27, 1984 [DE] Fed. Rep. of Germany ....... 3411160

[51] Int. Cl.$^4$ .............................................. B60S 1/20
[52] U.S. Cl. ................................ 15/250.23; 15/250.24
[58] Field of Search .......... 15/250.21, 250.23, 250.19, 15/250.24

[56] References Cited

U.S. PATENT DOCUMENTS 2,494,408  1/1950  Rice, Jr. .......................... 15/250.23
2,629,891  3/1953  Greene ............................ 15/250.23

FOREIGN PATENT DOCUMENTS 2430831  1/1976  Fed. Rep. of Germany ... 15/250.24

Primary Examiner—Peter Feldman
Attorney, Agent, or Firm—Michael J. Striker

[57] ABSTRACT

A wiper device for wiping panes of motor vehicles includes a wiper having an oscillating arm and a blade positioned against the pane, and a drive for, imparting the oscillating movement to the wiper. To synchronously influence the wiper in its oscillating movement a transmitting pulling rope drive is provided, which is connected to the oscillation drive and cooperates with the wiper arm. In dependence upon the angle included between the blade in its reverse position and the blade in its respective operative position the wiper blade can be adjusted to predetermined operational conditions.

23 Claims, 11 Drawing Figures

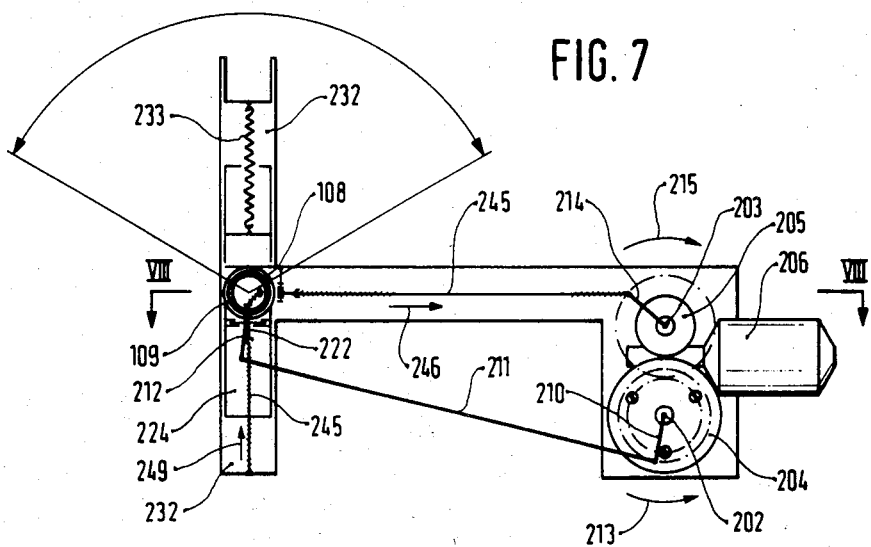
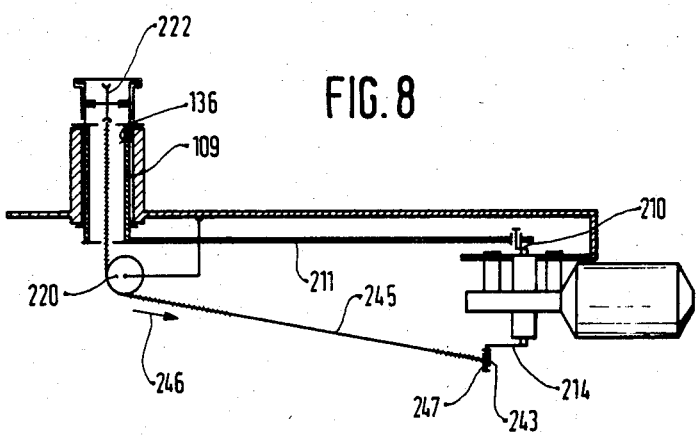

WINDSHIELD WIPER DEVICE

BACKGROUND OF THE INVENTION

The present invention relates to a windshield wiper device utilized in motor vehicles.

Wiper mechanisms of the type under discussion have been known. Such wiper mechanisms include a wiper blade which is movable over a windshield pane, so that the wiper blade is not dynamically affected during the wiping movement.

Wiper devices of the foregoing type have been also known, in which the wiper blade can be displaced, during its oscillating movement, to a predetermined area in its longitudinal extension on the windshield pane, so that the area to be wiped off by the wiper blade be more favorably positioned and/or enlarged. The influence of the individual drive member, which has been used for the oscillating movement on the wiper blade, has been decreased.

SUMMARY OF THE INVENTION

It is an object of the present invention to provide an improved adjustable windshield wiper device.

This and other objects of the invention are attained by a windshield wiper device for motor vehicles, comprising a pane wiper oscillatingly movable over a pane to operation positions and to a reverse position and including a wiper blade being pressed against the pane, and a wiper arm connected to said wiper blade; a first driving means for driving said wiper in its oscillating movement; a second driving means for adjusting said wiper; and transmitting means connected to said wiper and engaged on said second driving means, said transmitting means acting on said wiper in dependence on an angle ($\alpha$) defined between the wiper when the latter is in its reverse position and the wiper when the latter is in a respective operation position.

The advantage of the wiper device according to the present invention resides in the fact that the influence of the second drive means on the wiper blade can be adjusted to operation requirements without any difficulties. These requirements can be, for example such as a displacement of the wiper blade in the direction of its elongation on the pane, an adjustment of the pressure of the wiper blade against the pane, an adjustment of the position of the wiper blade relative to the longitudinal extension of the wiper arm, etc. The wiper device according to the present invention can be simultaneously adjusted to meet several of the above indicated requirements.

The transmitting means may include at least one rope-like element, which can be bendable or pressure-resistant and stiff. The rope-like element may be a rope, cable, wire or any other elongated element providing for a pulling drive action.

The first driving means and the second driving means each may include a drive shaft, a reduction gear connected to the drive shaft, and a crank, also connected to the drive shaft.

The device may further include a common drive motor connected to each reduction gear, said reduction gears operating to differently reduce the number of revolutions of each drive shaft.

The reduction gear of the first driving means may have a smaller number of revolutions than that of the reduction gear of the second driving means.

The drive shaft of the first driving means may be rotated with the speed which is in ratio 1:4 to the speed of the drive shaft of the second driving means.

The device may further include an oscillation drive connected to said wiper arm, said drive shaft of the first driving means acting on said oscillation drive.

The wiper may further include an oscillating shaft connected to said wiper arm, said oscillation drive having a driven member connected to said oscillating shaft.

The device may further include a driving rod having an end connected to said rope-like element, the drive shaft of the second driving means acting on said driving rod, said wiper arm including an inner portion rigidly connected to said oscillation drive and an outer portion connected to said wiper blade and guidably displaceable on said inner portion in a direction of elongation of said wiper arm, said rope-like element extending through said inner portion and being secured at an end thereof to said outer portion.

The oscillating shaft may have an axial bore, said inner portion having a perforation merging into said bore, said rope-like element extending through said bore and the perforation in the inner portion of the wiper arm.

The driving rod may have one recess; said outer portion of said arm having another recess, said rope-like element extending from said one recess through said perforation and along said another recess, and wherein said driving rod and said inner portion lie in two substantially parallel planes spaced from each other, said driving rod and said inner portion each having an axis of elongation, the axis of elongation of said driving rod being transversal of the axis of elongation of said inner portion.

The device may include an additional rope-like element connected to said driving rod in spaced relationship with said first mentioned rope-like element, both rope-like elements superimposing one another and extending through said perforation bore and being connected at their ends to said outer portion of the wiper arm.

The outer portion of the wiper arm may be a guiding slide which surrounds said inner portion at least at three sides thereof.

The wiper device may further include means for deflecting said rope-like elements, said deflecting means being arranged at an inlet and an outlet of said axial bore and at said perforation bore.

The device may further include spring means positioned on said inner portion and prestressed between said inner portion and outer portion during a displacement of said additional rope-like element, actuated by the crank of the second driving means, when the crank is moved in one direction, said spring means causing a counter displacement of said element when the crank is moved in an opposite direction.

Each reduction gear may be a worm gear drive, both reduction gears having a common worm shaft, each reduction gear including a worm gear which is in mesh with said worm shaft, said reduction gears being positioned substantially opposite to each other relative to said worm shaft.

The device may include an axle supported against the pane, and wherein two rope-like elements are provided, which cooperate with said second driving means, each of said rope-like elements being drawn to said axle and being engaged with said wiper blade at two opposite sides thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING SCHEMATIC

FIG. 7 is a principle representation of another modification of the wiper mechanism;

FIG. 8 is a sectional view taken along line VIII—VIII of FIG. 7;

DETAILED DESCRIPTION OF THE PREFERRED EMBODIMENTS

Figure 1:
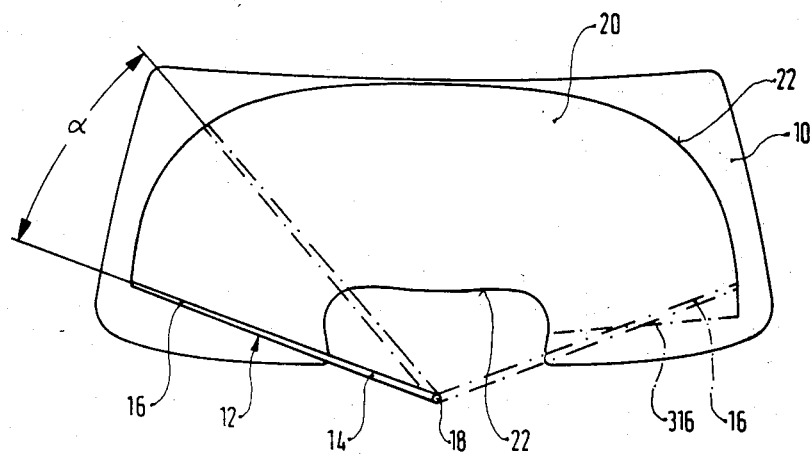
FIG. 1 is a schematic top plan view of the windshield of a vehicle, with a one-lever wiper mechanism the wiper blade of which is oscillatingly displaced over the windshield.

Referring now to the drawings in detail, and first to FIG. 1 thereof, it will be seen that the wiper mechanism including a windshield wiper 12 is arranged on a windshield 10 of a non-shown motor vehicle. The windshield wiper 12 has an oscillatingly driven wiper arm 14, to the free end of which a wiper blade 16 is coupled. The wiper 12 is connected with an oscillatingly driven wiper shaft 18 so that the wiper blade 16, pressed against the windshield 10, covers a wiping area 20. The contour of the wiping area 20, formed by a circular segment, is limited by line 22 which is described by the wiper blade 16 in its oscillating movement between two end positions shown by solid and dashed lines in FIG. 1. Both operative positions of the wiper blade 16 show the oscillating reverse positions which are obtained by the oscillating movement of the wiper arm 14.

Figure 2:
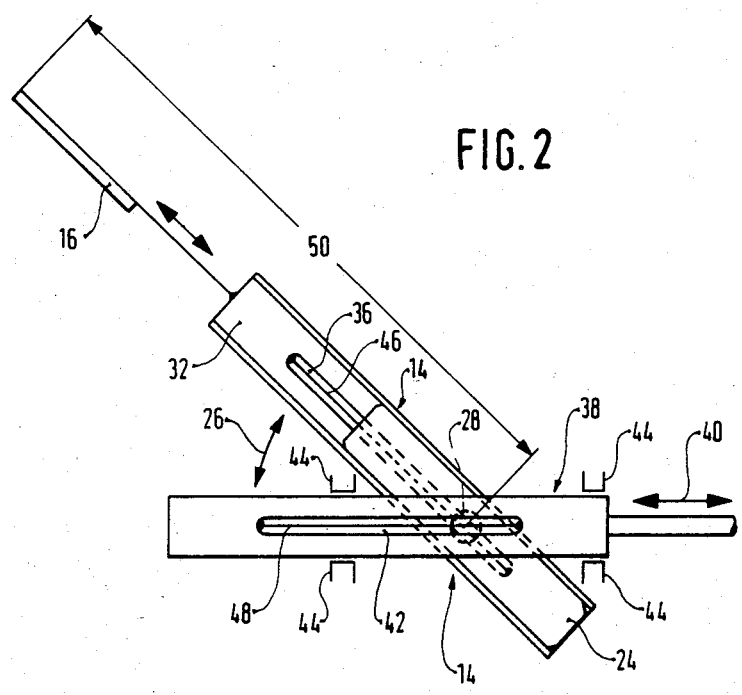
FIG. 2 is a schematic representation of the drive of the wiper mechanism in one operative position.
Figure 3A:
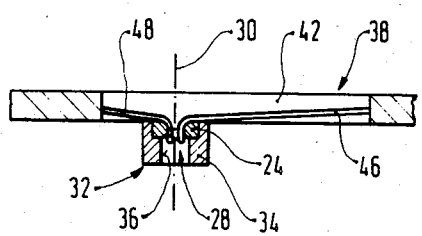
FIG. 3a is a sectional view taken along line IIIa—IIIa of FIG. 3.
Figure 3:
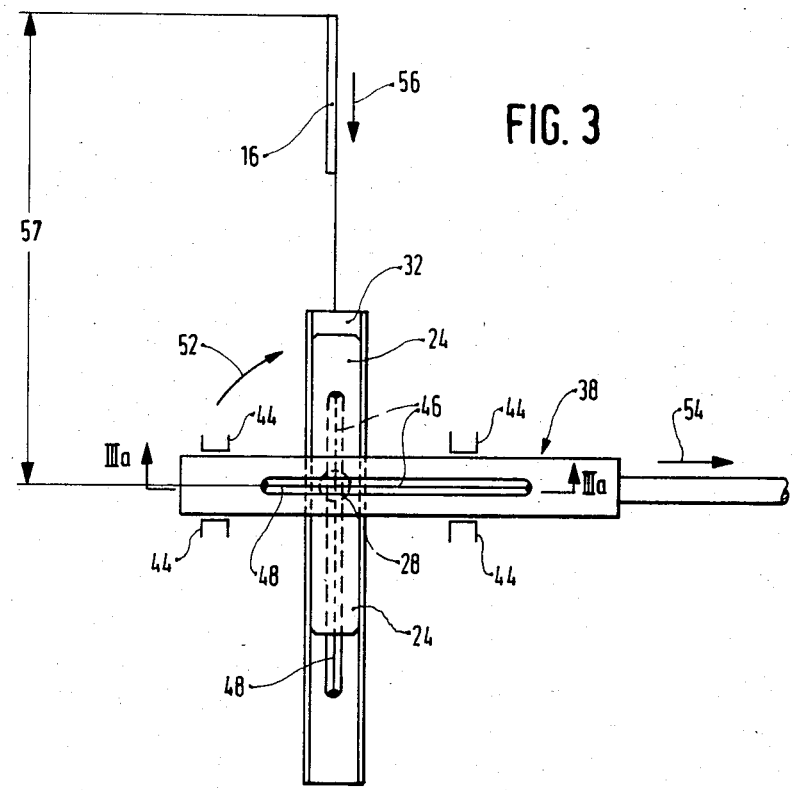
FIG. 3 is a principle schematic representation of the drive of FIG. 2 in another operative position.

With reference to FIGS. 2, 3 and 3a the mode of operation of the wiper arm 14 as well as its structure will be now described. The wiper arm 14 is formed as a multi-portion member. The wiper arm includes an inner portion 24 which is driven to perform an oscillatory movement in the direction of the double arrow 26. As will be described herein below the oscillatingly driven wiper shaft is a hollow shaft which is rigidly secured to an inner portion 24 of the wiper arm. The elongated opening, formed in the hollow shaft, is shown in the principle representation, depicted in FIGS. 2, 3 and 3a as a perforation 28 which surrounds an oscillating axis 30. A portion 32 of the wiper arm is displaceably guided over the inner portion 24 of the wiper arm 14. The wiper arm portion 32, as seen in FIG. 3a in particular, is formed as a slide guide. The wiper blade 16 as shown in FIG. 2 is connected to the free end of the wiper arm portion 32. A base portion 34 of the slide guide 32, which is of U-shaped cross-section, has a longitudinal slot 36.

As can be seen from FIG. 2 a driving rod 38 is positioned before the wiper arm portion 24. The driving rod 38 is reciprocally movable in the direction of the double arrow 40. This driving rod has a longitudinal slot 42. The free end of the driving rod 38 is floatingly guided in guides 44 so that the displacement of the driving rod is not hindered. The non-illustrated end of the driving rod 38 is connected in the known fashion to a rotating crank so that the rotation movement of the crank is translated into the reciprocal movement of the driving rod, indicated by arrow 40. The longitudinal slots 36 and 42 in the wiper arm portion 32 and driving rod 38, respectively, are arranged so that these slots extend in two planes, which are spaced from each other, and pass over the perforation 28 formed in the wiper arm portion 24. A rope 46 is secured to the wiper arm portion 32 at the end of slot 36. This rope is positioned in the longitudinal slot 36 and extends up to the perforation 28. This rope then penetrates into the wiper arm portion 24 through perforation 28 and extends into the longitudinal slot 42 of the driving rod 38. Rope 46 extends through the slot 42 in the direction of the slot end facing the non-illustrated crank, wherein the rope 46 is fixed. At another end of the longitudinal slot 42, facing the free end of the driving rod 38, the end of a second rope 48 is secured. This second rope 48 extends in slot 42 in the direction towards perforation 28 provided in the wiper arm portion 24, then penetrates through this perforation and extends in the longitudinal slot 36 of wiper arm portion 32 towards the end of slot 36 which faces away from the wiper blade 16. It is essential in this arrangement that rope 46 extends from the end of slot 36, facing toward the wiper blade 16 to the end of slot 42 in rod 38, which faces towards the non-shown drive crank. The second rope 48, on the other hand, extends from the end of slot 36, which faces away from the wiper blade 16, through perforation 28 into the slot 42 in which it is fixed at the end thereof, facing away from the drive crank.

In the above-described arrangement, as well as in the embodiments which will be disclosed below, ropes are utilized as a movement-translating means. It is, however, within the skills of an artisan to use ropes or substitute the latter with tapes, wires, for example of plastics, or with a rigid cable.

The mode of operation of the device shown in FIGS. 2 and 3 is as follows:

When the wiper arm 24, 32 is in the position corresponding to FIG. 1 the wiper 12 takes such position when it performs a pivoting movement over an angle α as shown in FIG. 1. In this operative position the windshield wiper 12 has its largest actual length as indicated by distance 50 in FIG. 2. The conventional and non-shown oscillating drive for driving the wiper shaft 18 pivots the wiper arm 24, 36 in the direction of arrow 52 to the operation position of FIG. 3, in which the wiper arm 24, 32 intersects the driving rod 38 at an approximately right angle. During the oscillating movement in the direction of arrow 52 the conventional non-shown driving member draws the driving rod in the direction of arrow 54 (FIG. 3) and thereby draws rope 46 in the same direction. The pulling force is transmitted from the rope 46 to the wiper arm portion 32, so that the latter, guided over the wiper arm portion 24, is displaced in the direction of arrow 56. The oscillatory movement of the wiper blade 16, indicated by arrow 52, is superposed as indicated by arrow 56. The actual length of the windshield wiper is thereby shortened to a distance 57; the term "effective length of the windshield wiper" defines the distance from the axis of oscillation 30 of the wiper shaft to the free end of the wiper blade 16.

Figure 4:
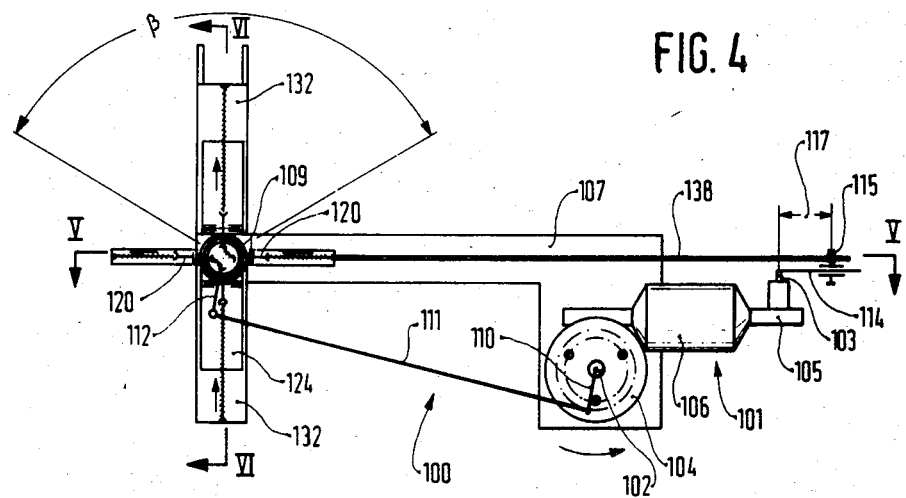
FIG. 4 is a schematic side view of the wiper mechanism according to a first embodiment of the invention.
Figure 5:
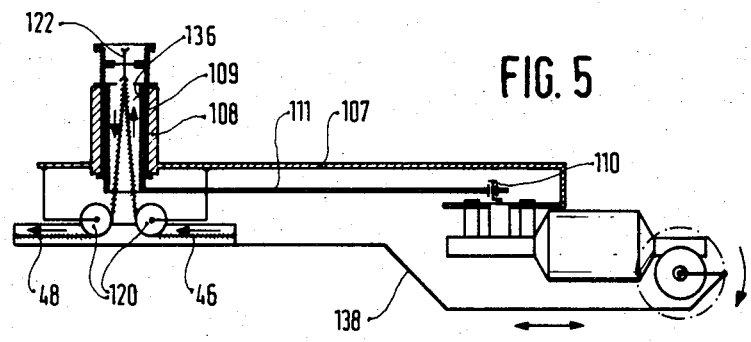
FIG. 5 is a sectional view taken along line V—V of FIG. 4.
Figure 6:
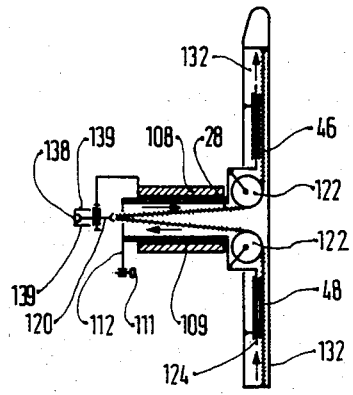
FIG. 6 is a sectional view taken along line VI—VI of FIG. 4.

The above described principle of the operation of the wiper drive is carried out in the wiper mechanism illustrated in FIGS. 4 through 6, in which the drives for the wiper shaft 18 and the driving rod 38 are also shown. The wiper mechanism 100 includes a drive aggregate 101 which has two drive shafts 102 and 103. The drive shafts 102 and 103 belong, respectively to reduction gears 104, 105 which are driven by a common electric motor 106. The reduction gears 104 and 105 have a variable reduction ratio. In the exemplified embodiment this ratio is so selected that the drive shaft of the reduction gear 104 performs one revolution when the drive shaft 103 of the reduction gear 105 carries out four revolutions. The drive aggregate 101 is positioned on a stationary chassis 107. A stationary bearing sleeve 108 is provided on chassis 107. An oscillatory wiper shaft 109 formed as a hollow shaft is supported in the bearing sleeve 108. From the drive shaft 102 a rotating crank 110 extends, to which a driving rod 111 is coupled. A rocking arm 112 is pivotally connected to the driving rod 111. The other end of the rocking arm 112 is rigidly secured to the wiper shaft 109. When crank 110 rotates the wiper shaft 109 oscillates in the bearing sleeve 108 through an angle $\beta$.

Another crank 114 is also connected to the second drive shaft 103. A crank pin 115 is adjustably and fixably guided on the crank 114 so that an effective crank radius 117 and thereby the value of the influence on the wiper blade can be adjusted to certain requirements. A second driving rod 138 is coupled to the crank pin 115. Driving rod 138 corresponds to the driving rod 38 of FIGS. 2, 3 and 3a.

As can be seen from FIGS. 5 and 6 in particular, the free end portion of the driving rod 138 is U-shaped, and ropes 46 and 48 are positioned within the driving rod 138. Ropes 46, 48 extend into the region of the perforation 136, which is formed by an elongated bore in the wiper shaft 109, and are deflected by deflecting rollers 120, acting as a guiding means, so that the ropes are led into the wiper shaft 109. A certain guidance of the driving rod 138 is obtained so that arms or portions 139 of the U-shaped driving rod laterally engage rollers 120. However, it is ensured that a sufficient play between arms 139 and rollers 120 be available and that the operative movement of the driving rod 138 would not be influenced. At the side of the wiper shaft 109, facing away from rollers 120, the ropes 46 and 48 are taken along by guide rollers 122 and are so deflected that they move the guide element or portion 132 in the longitudinal direction. It is understandable that guide portion 132 corresponds to the wiper arm portion 32 of FIGS. 2 and 3. The guide portion 32 formed as a guide slide is guided over the wiper arm inner portion 124 which is rigidly connected to the wiper shaft 109. The course of running of ropes 46 and 48 in this arrangement completely corresponds to that of the device shown in FIGS. 2, 3 and 3a. Since the mode of operation of the rope-pulling device of the arrangement of FIGS. 2, 3 and 3a has been described herein above it is not necessary to disclose in detail the operation of the rope-pulling device of the embodiment of FIGS. 4–6.

When the drive aggregate 101 is set into operation and the drive shafts 102 and 103 rotate the wiper shaft 109 will be displaced in its oscillating movement by the oscillatory drive 110, 111 and 112. Simultaneously, however the crank 114 also rotates and moves the driving rod 138. A reciprocal movement of the wiper blade 16 will now result from the action of the rope-pulling drive whereas at the same time an oscillating movement will be imparted to the wiper blade via the wiper arm portions 132, 124. As can be seen from FIG. 1 the wiper arm 14 has its smallest length 56 (FIG. 3) and is in the operative position shown by solid line and should, in the case of a greater pivoting angle $\alpha$, first enlarge its effective wiper length. The greatest wiper length 50 must be reached when the wiper blade 16 is in the corner area of the windshield 10. Then the portion 132 of the wiper arm must be moved in the opposite direction, also along arrow 56 of FIG. 3 unless the wiper is of its shortest length 57. This is the case when the windshield wiper 12 takes the position corresponding to the half of the oscillating angle $\beta$, as shown in FIG. 3, and also stands vertically. Afterwards the movement of the wiper in the forward direction, actuated by the drive shaft 103 takes place unless the wiper 12 or wiper blade 16 comes to its other reverse position which is shown on FIG. 1 by a dash-dotted line. During the rearward movement to a reverse position a similar adjustment of the wiper arm 14 takes place. It is to be understood that crank 114 must rotate many times quicker than crank 110.

It is understandable that in the exemplified embodiment of FIGS. 4 to 6 both reduction gears 104, 105 are arranged on two opposite ends of the electric motor 106. An armature shaft of electric motor 106 is also extended at both sides of the motor and in the exemplified embodiment is formed as a worm shaft which is in mesh with the worm gears of the reduction gears 104 and 105, respectively. The drive shafts 102 and 103 cooperate in the known fashion with those worm gears.

In the embodiment illustrated in FIGS. 7 and 8 a worm shaft extends outwardly from the electric motor 206. Two opposing worm gears, which are in mesh with the worm shaft, belong, respectively to reduction gears 204 and 205. Each reduction gear 204, 205 has a drive member or shaft 202, 203. The drive shafts 202, 203 are rotated in the directions of arrows 213, 215, respectively. The reduction ratio of reductors gears 204, 205 is variable.

In the embodiment shown in FIGS. 7 and 8 the drive shaft 202 must make one revolution while the drive shaft 203 makes four revolutions. The drive shaft 202 is connected to the oscillatory drive which includes a crank 210, a driving rod 211 and a rocking arm 212. The rocking arm 212 in this embodiment is also rigidly connected to the wiper shaft 109 which is oscillatingly supported in the bearing sleeve 108. Crank 214 is connected to the drive shaft 203. A pulling rope 245 is connected by means of the hinge to the crank 214. The pulling rope 245 is provided with a bearing sleeve 243 in which a crank pin 247, rotated by crank 214, is positioned. The pulling rope 245 extends up to the stationarily positioned roller 220 in the region of the inlet of axial bore 136 formed in the wiper shaft 109. The pulling rope 245 extends through the wiper shaft 209 and is directed to a further guide roller 222 which is positioned on the inner portion 224 of the wiper arm, portion 224 being rigidly connected to the wiper shaft 109. Rope 245 further extends from the guide roller 222 in the direction of the end of the wiper arm, facing away from the wiper blade, to the slide guide portion 232 guided over the inner portion 224. Pulling rope 245 is connected to the wiper arm portion 232. A spring means formed by a tension spring 233 is arranged in the end portion of the guide slide 232 opposite to its portion, in which rope 245 is accommodated. The spring means 233 is, on the one hand, connected to the wiper arm portion 224 and, on the other hand, to the wiper arm portion 232. The tension spring 233 is thereby prestressed. When now crank 214 is rotated in the direction of arrow 215 the pulling rope 245 is drawn in the direction of arrow 246, and the pulling force is transmitted to the wiper arm portion 232 so that the arm portion 232 is guided on the arm portion 224 upwardly in the direction of arrow 249. The wiper arm approaches its greatest effective length which is indicated by 50 in FIG. 2. When the pulling stage of the rotating crank ends the strongly-prestressed tension spring 233 pulls the arm portion 232 downwardly unless the smallest effective length of the wiper arm is reached. A sudden shortening of the wiper arm is impossible because, due to the stressed pulling rope 245, this shortening depends upon a corresponding position of the crank 214.

It is evident that the mode of operation of the rope drive of the embodiment of FIGS. 7 and 8 corresponds to that of the embodiment of FIGS. 2, 3 and 3a or 4 to 6. The distinction of the operation mode of the embodiment according to FIGS. 7 and 8 resides in the fact that the reverse guiding of the adjustable wiper arm is affected by the force of the spring rather than by the second pulling rope, whereby the construction of the wiper device is considerably simplified.

Figure 9:
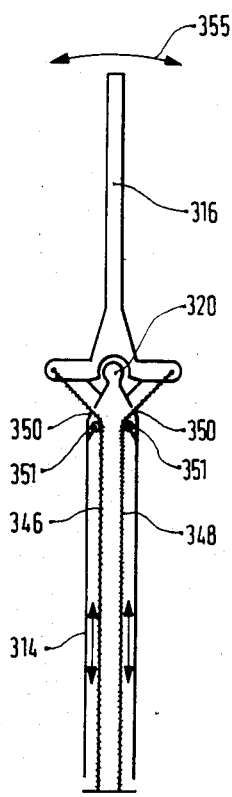
FIG. 9 is a schematic view of an arrangement, in which the wiper blade is pivotable about an axis positioned on the windshield to be wiped off.

In the embodiment depicted in FIG. 9 the wiper blade designated here by a reference numeral 316 is pivoted about an axle 320 by means of the second rope. Axle 320 is positioned on the pane to be wiped off. Both pulling ropes 346 and 348 are connected to the movable wiper blade and, also to the pivot axle 320. Upon pulling of either the rope 346 or the rope 348 the wiper blade 316 is pivoted relative to the wiper arm 314. The latter is tubular in this embodiment so that the pulling ropes 346, 348 are shielded within the wiper arm. Pulling ropes 346, 348 extend in the region of the free end of the wiper arm 314 through openings 350 and are deflected by deflection means formed by guide blocks 351. This fashion of the pivoting of the wiper blade can be advantageous when the wiper blade must be adjusted in the area of its reverse position to the pane edge. Such operative position is indicated by reference 316' in FIG. 1.

Figure 10:
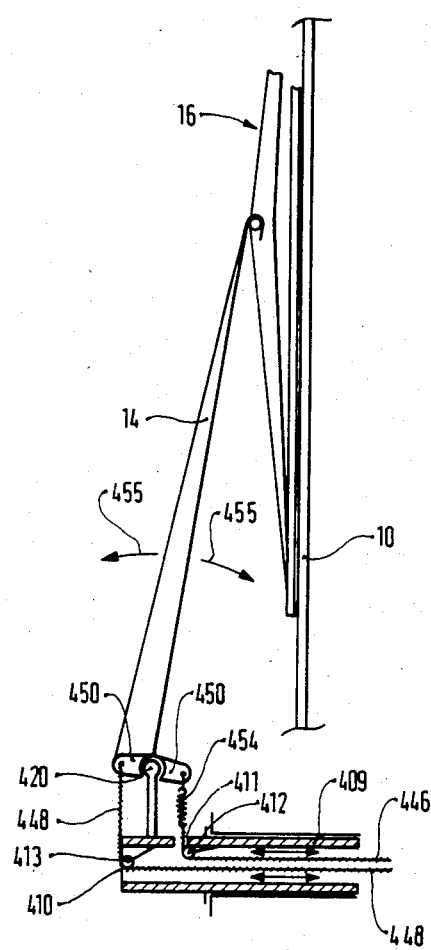
FIG. 10 is a schematic view, partially in section, of the arrangement, in which a pressing force of the wiper blade against the windshield can be adjusted or the wiper blade can be lifted off the windshield when it is in its park position.

It is also conceivable to use the pulling rope drive for the adjustment of the pressure of the wiper on the pane 10. Such an arrangement is shown in FIG. 10. In this arrangement both ropes 446 and 448 are guided through the wiper shaft 409 and extend outwardly from this shaft through the openings 410 and 411, respectively. The deflection of pulling ropes 446 and 448 is provided by guide blocks 412 and 413. The wiper arm 14, which carries at its free end the wiper blade 16, is supported on a pivot axle 420 which is spaced from the plane of wiping and extends at least substantially parallel to that plane. Laterally of the pivot axle 420, pulling ropes 446 and 448 are connected, via a lever 450, to the wiper arm 14. Upon pulling of one rope and an abatement of another rope, the pivoting movement of the wiper in the direction of one of arrows 455 can be obtained. It is clear that the wiper blade can be loaded or unloaded relative to the pane 10. It is also possible that the wiper plade can be lifted from pane 10 in case of emergency. The basic loading of the wiper blade 16 relative to the windshield 10 can be obtained by the interposition of a respectively prestressed tension spring 454.

All the above-described embodiments of the invention have in common the fact that they are actuated by a pulling rope-drive which is in principle illustrated in FIGS. 2, 3 and 3a. One or a number of the pulling ropes of the pulling rope-mechanism translate a force and/or movement of one of two drive members to the wiper blade, the movement of which is affected in a predetermined desired manner. It can be accurately determined by a respective selection of the number of revolutions of the drive members or shafts in which position of the wiper blade a predetermined degree of the wiper blade influence should be attained. The influence on the wiper blade can be obtained by the changing of the effective length of the wiper arm through the changing of the position of the wiper blade relative to the position of the wiper arm or by the adjustment of the pressure of the wiper blade against the pane being cleaned. More than one adjustments of the wiper blade are possible by respective embodiments of the wiper mechanisms.

It is understood that an individual electric motor can be arranged for each of the reduction gears 104, 105 or 204, 205 if desired.

It will be understood that each of the elements described above, or two or more together, may also find a useful application in other types of wiper devices for motor vehicle windshields differing from the types described above.

While the invention has been illustrated and described as embodied in a wiper device for motor vehicle windshields, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A windshield wiper device for motor vehicles, comprising a pane wiper oscillatingly pivotally movable over a pane to operation positions and to a reverse position and including a wiper blade being pressed against the pane, and a wiper arm connected to said wiper blade; a first driving means (110, 111) for driving said wiper in its oscillating pivotal movement; a second driving means (114) for imparting to said wiper a reciprocal straight-line movement; transmitting means connected to said wiper and engaged on said second driving means, said transmitting means acting on said wiper in dependence on an angle ($\alpha$) defined between the wiper when the latter is in its reverse position and the wiper when the latter is in a respective operation position, said transmitting means including at least one rope-like element, said first driving means and said second driving means each including a drive shaft, a reduction gear connected to the drive shaft, and a crank also connected to the drive shaft; a common drive motor connected to each reduction gear, the reduction gears operating to differently reduce the number of revolutions of each drive shaft; said first driving means including an oscillation drive (110, 111, 112) connected to said wiper arm, said drive shaft (102) of the first driving means acting on said oscillation drive, said wiper further including an oscillating shaft (109) connected to said wiper arm, said oscillation drive having a driven member (112) connected to said oscillating shaft; and a driving rod (38, 138) having an end connected to said rope-like element (46), the drive shaft (103) of the second driving means acting on said driving rod, said wiper arm (14) including an inner portion (24) rigidly connected to said oscillation drive and an outer portion (32, 132) connected to said wiper blade (16) and being guidably displaceable on said inner portion in a direction of elongation of said wiper arm, said rope-like element extending through said inner portion and being secured at an end thereof to said outer portion.

2. The device as defined in claim 1, wherein said rope-like element is bendable.

3. The device as defined in claim 1, wherein said rope-like element is pressure-resistant.

4. The device as defined in claim 1, wherein the reduction gear of the first driving means has a smaller number of revolutions than that of the reduction gear of the second driving means.

5. The device as defined in claim 4, wherein the drive shaft of the first driving means rotates with the speed which is in ratio 1:4 to the speed of the drive shaft of the second driving means.

6. The device as defined in claim 1, wherein said inner portion (124) is rigidly connected to said oscillating shaft (109).

7. The device as defined in claim 6, wherein said oscillating shaft has an axial bore (136), said inner portion having a perforation (28) connected to said bore, said rope-like element extending through said bore and said perforation.

8. The device as defined in claim 1, wherein said inner portion has a perforation bore.

9. The device as defined in claim 8, wherein said driving rod (38) has one recess (42); said outer portion of said arm having another recess (36), said rope-like element extending from said one recess through said perforation and along said another recess, and wherein said driving rod (38) and said inner portion (24) lie in two substantially parallel planes spaced from each other, said driving rod and said inner portion each having an axis of elongation, the axis of elongation of said driving rod being transversal of the axis of elongation of said inner portion.

10. The device as defined in claim 9, further including an additional rope-like element (48) connected to said driving rod in spaced relationship with said first mentioned rope-like element (46), both rope-like elements superimposing one another and extending through perforation bore and being connected at their ends to said outer portion of the wiper arm.

11. The device as defined in claim 7, further including an additional rope-like element (48) connected to said driving rod and spaced from said first mentioned rope-like element (46), both rope-like elements extending through said axial bore (136) of said oscillating shaft and through said perforation bore (28) and being connected at their ends to said outer portion of said wiper arm.

12. The device as defined in claim 10, wherein said first mentioned rope-like element (46) is positioned in the recess of said outer portion and said additional rope-like element (48) is positioned in the recess of said driving rod.

13. The device as defined in claim 11, wherein said outer portion is a guiding slide which surrounds said inner portion at least at three sides thereof.

14. The device as defined in claim 12, wherein said outer portion is a guiding slide which surrounds said inner portion at least at three sides thereof.

15. The device as defined in claim 13, further including means (120, 122) for deflecting said rope-like elements, said deflecting means being arranged at an inlet and an outlet of said axial bore and at said perforation bore.

16. The device as defined in claim 11, further including spring means (233) positioned on said inner portion and being prestressed between said inner portion and said outer portion during a displacement of said additional rope-like element, actuated by the crank of the second driving means, when the crank (214) is moved in one direction, said spring means causing a counter displacement of said element when the crank (214) is moved in an opposite direction.

17. The device as defined in claim 16, wherein said element is a pulling rope which is pivotally connected to said crank.

18. The device as defined in claim 11, wherein the crank of the second driving means is a rotatable member with a crank radius which is adjustable.

19. The device as defined in claim 1, wherein each reduction gear is a worm gear drive, both reduction gears having a common worm shaft, each reduction gear including a worm gear which is in mesh with said worm shaft, said reduction gears being positioned substantially opposite to each other relative to said worm shaft.

20. The device as defined in claim 15, wherein said deflecting means are deflecting rollers, said driving rod (138) being substantially U-shaped and surrounding said rollers (120) in the region of said oscillating shaft.

21. The device as defined in claim 1, further including an axle (320) supported against the pane, and wherein two rope-like elements are provided, which cooperate with said second driving means, each of said rope-like elements being drawn to said axle and being engaged with said wiper blade at two opposite sides thereof.

22. The device as defined in claim 1, further including a pivot axle (420) connected to said first driving means, said wiper arm with said wiper blade being pivotable about said axle, said axle lying in a plane which is parallel to the pane and extends in the direction of wiping.

23. The device as defined in claim 22, wherein two rope-like elements (446, 448) are provided, which cooperate with said second driving means, said rope-like elements being drawn to said axle and being engaged with said wiper arm (14) at two opposite sides thereof.

* * * * *